(12) United States Patent
Hata

(10) Patent No.: US 6,363,222 B2
(45) Date of Patent: Mar. 26, 2002

(54) AUTOMATIC EXPOSURE CONTROL DEVICE FOR A CAMERA

(75) Inventor: Yukitsugu Hata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/725,118

(22) Filed: Nov. 29, 2000

(30) Foreign Application Priority Data

Dec. 1, 1999 (JP) ............................................. 11-341671

(51) Int. Cl.$^7$ ........................... G03B 7/095; G03B 9/02; G03B 7/10
(52) U.S. Cl. ...................... 396/257; 396/505; 396/259; 396/508
(58) Field of Search ................................. 396/257, 259, 396/505, 508

(56) References Cited

U.S. PATENT DOCUMENTS 4,017,873 A * 4/1977 Shenk et al. ................ 396/66
5,634,163 A * 5/1997 Kamata ....................... 396/458

* cited by examiner

Primary Examiner—David M. Gray
Assistant Examiner—Rochelle Blackman
(74) Attorney, Agent, or Firm—Young & Thompson

(57) ABSTRACT

A photo diode and a resistor are connected to each other in series. A gate of a FET is connected to the connection of the photo diode and the resistor. When a photometry switch is turned on, the photo diode generates a photo current according to a subject brightness. A potential difference is generated between the both terminal of the resistor. When the subject brightness is less than a threshold level, the FET is not turned on because of low potential difference of the resistor. When a subject brightness is equal to or more than the threshold level, the FET is turned on because of high potential difference of the resistor. A first transistor turned to be in a state opposite to the FET and a second transistor turned on and off according the state of the first transistor are provided. When the FET is turned off, the second transistor is turned on, and a solenoid is powered. The solenoid moves a stop plate out of an optical axis such that an exposure is taken through a large stop opening. When the FET is turned on, the second transistor is turned off, so the solenoid is not driven. Since the stop plate is set on the optical axis, an exposure is taken through a stop-down opening.

14 Claims, 8 Drawing Sheets

AUTOMATIC EXPOSURE CONTROL DEVICE FOR A CAMERA

BACKGROUND OF THE INVENTION

1. Field of the Invention

The present invention relates to an automatic exposure control device of a camera, more particularly, the present invention relates to an automatic exposure control device for changing over a size of a stop opening according to subject brightness.

2. Background Arts

Lens-fitted photo film units having pre-loaded photo films are widely sold as one kind of simple cameras. In the lens-fitted photo film unit (hereinafter referred to as film unit), it is unnecessary to load and take out the photo film, so the film unit makes it possible to photograph by simple operation. Moreover, a fixed-focus lens and a shutter mechanism the shutter speed of which is fixed are used in the film unit in order to reduce the manufacturing cost.

The exposure value is constant when the aperture size and the shutter speed are fixed. In severe photographing condition, there is a case in which an exposure amount is out of the latitude of the photo film, so that the photo film is extremely over-exposed. In order to widen the range of subject brightness for proper exposure, it is proposed to provide an automatic exposure control device in the film unit for controlling exposure amount according to subject brightness.

The automatic exposure control device comprises a stop control circuit and a stop changeover mechanism. The stop control circuit drives an electromagnetic driving unit like a solenoid according to subject brightness measured by a light receiving element. The electromagnetic driving unit drives the stop changeover mechanism to change over size of stop opening. In the stop changeover mechanism for changing over size of stop opening by two steps, a large stop opening is set on a photographing optical axis when subject brightness is under the threshold level. A small stop opening is set on a photographing optical axis when subject brightness is equal to or more than the threshold level.

As the light receiving element, a cadmium sulfide (CdS) element is popularly used. The CdS element is low priced, but have dispersion in sensitivity. Moreover, the CdS element has characteristics to vary its resistance widely according to temperature and voltage of power source. Therefore, it is difficult to measure subject brightness precisely.

A photo diode can be used as the light receiving element. The individual variation in sensitivity of the photo diode is less than that of the CdS element. And the photo diode is less influenced by the fluctuation of the temperature and the power voltage (inversely biased voltage). With these reasons, the photo diode makes it possible to measure subject brightness precisely. Furthermore, the response speed of the photo diode is faster than that of the CdS element, so it is preferable to use the photo diode in the case where a momentary photometry is needed.

However, since the photo current of the photo diode is less than 1 $\mu$A when subject brightness is around the threshold level, it is difficult to decide precisely whether subject brightness is equal to or more than the threshold level. Accordingly, the photo current of the photo diode is needed to be amplified by an amplifier, such as an OP amp. It causes complication of the photometry circuit and high manufacturing cost. Furthermore, a 3 V to 5 V power supply is necessary to drive the amplifier. Although an R6 battery (1.5 V) is provided in the film unit as a power source of flash device, it is impossible to apply the battery as a power source of the automatic exposure control device.

SUMMARY OF THE INVENTION

In view of the foregoing, an object of the present invention is to provide an automatic exposure control device that measures subject brightness precisely and operates with low voltage.

Another object of the present invention is to provide an automatic exposure control device that is capable of being driven by a battery for driving a flash device.

To achieve the above objects, an automatic exposure device of the present invention is comprised of a photo diode for measuring subject brightness, a resistor connected to the photo diode, a field effect transistor (FET) having a gate and a source between which a terminal voltage across the resistor is applied. The FET is turned on when the voltage between the gate and the source is equal to or more than threshold level. The automatic exposure control device controls power to a solenoid according to state of the FET, and changes size of stop opening.

In the preferable embodiment of the present invention, a first transistor is connected to the FET. The first transistor is turned off when the FET is turned on, and is turned on when the FET is turned off. When the first transistor turns on, a second transistor is also turns on. The solenoid is connected to the second transistor. When the solenoid is turned on, a stop plate is retracted from an optical axis of a taking lens, so an exposure is taken through a large stop opening. When the solenoid is turned off, a stop plate is set on the optical axis, so an exposure is taken through a small stop opening.

In the more preferable embodiment of the present invention, the automatic exposure control device comprises a latch circuit for keeping the first transistor turned on. The latch circuit prevents changing over size of stop opening even in a case where the state of the FET changes while exposing. Moreover, the automatic exposure device comprises a capacitor for delaying operation of the first transistor. Since the state of the first transistor is defined after the state of the FET is stabilized, the automatic exposure control device operates stably. Electric power for driving the automatic exposure control device is supplied from a battery for a flash device. The charging operation of the flash device is forced to stop while the automatic exposure control device is in operation. Therefore, it is possible to prevent a faulty operation of the automatic exposure control device due to a decrease of the terminal voltage of the battery.

According to the present invention, since the exposure control device having the photo diode and the FET decides whether a subject brightness is equal to or more than a threshold level, the exposure control device can operate reliably on low voltage. Moreover, the exposure control device of the present invention is provided at a low cost because the configuration of the electronic circuit is simple.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
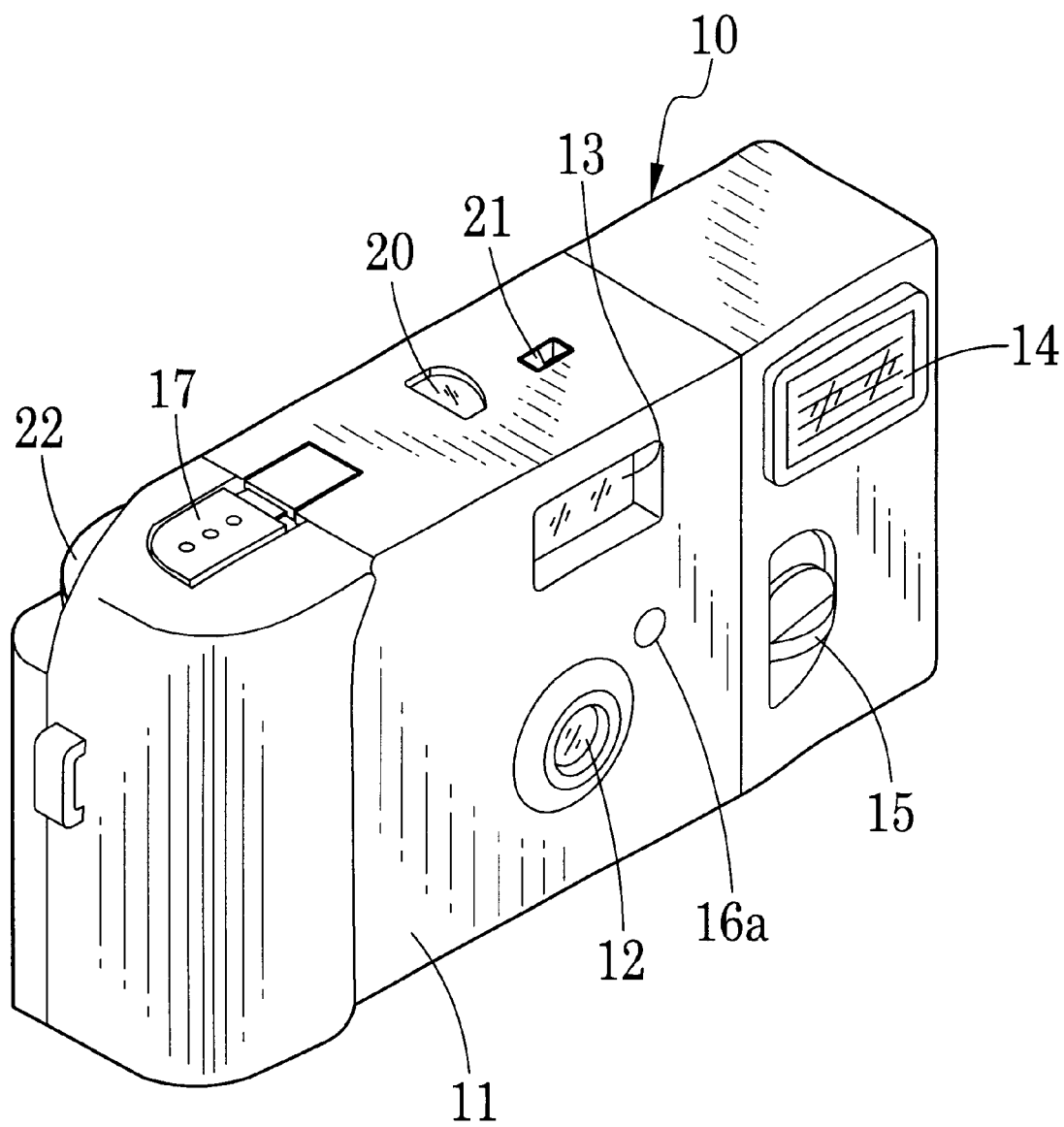
FIG. 1 is a perspective view of a lens-fitted photo film unit.

As shown in FIG. 1, a film unit is comprised of a housing 10 and a wrapping label 11 rolled around the housing 10. A taking lens 12, a viewfinder 13, a flash projector 14, a flash changeover plate 15 and a photometry window 16a are provided on front wall of the housing 10. A shutter button 17, a frame counter 20 and an indication light guide 21 are provided on a top wall of the housing 10, and a part of a winding dial 22 is exposed in a back wall of the housing 10.

Figure 2:
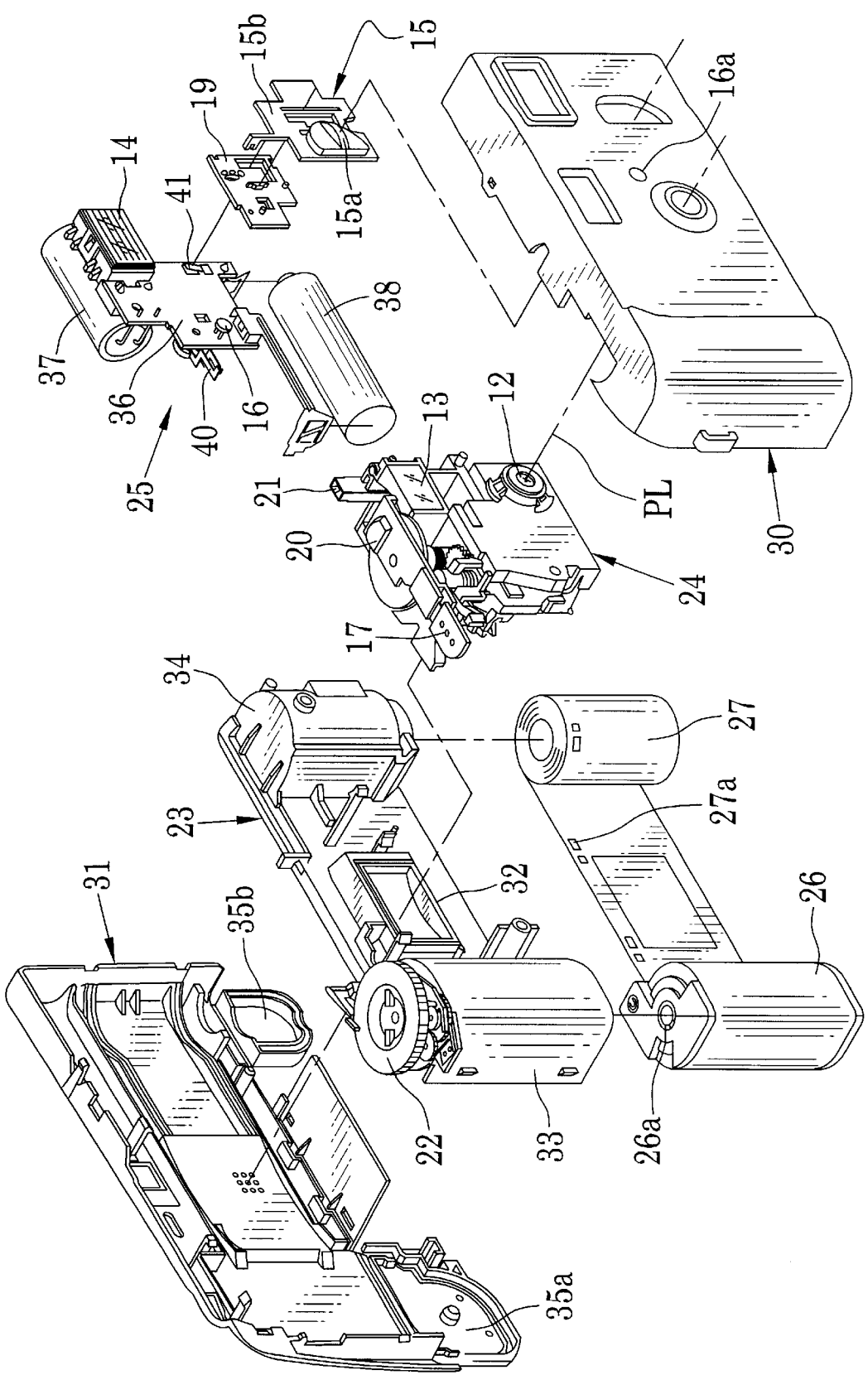
FIG. 2 is an exploded perspective view of a lens-fitted photo film unit.

As shown in FIG. 2, a photo film cassette 26 and a photo film 27 are previously loaded inside the housing 10. The housing 10 includes a basic portion 23, an exposure unit 24, a flash device 25, a front cover 30 and a rear cover 31. The exposure unit 24 and the flash device 25 are removably attached to the front side of the basic portion 23.

The basic portion 23 is comprised of an exposure opening 32 for determining the frame region of the photo film 27, a cassette chamber 33 for containing the photo film cassette 26, and a photo film chamber 34 for containing a roll of the photo film 27 that is pulled out of the photo film cassette 26. A winding dial 22 is rotatably attached to the top wall of the cassette chamber 33.

A shaft (not shown) provided below the winding dial 22 is engaged with a spool 26a that is formed inside the photo film cassette 26. One end of the photo film 23 is fixed to the spool 26a. When the spool 26a rotates counterclockwise subsidiary to the rotation of the winding dial 22a, the photo film 27 is wound into the photo film cassette 26 from the photo film chamber 34.

The front cover 30 is attached to the front side of the basic portion 23. The front cover 24 has several openings for emerging the taking lens 12, the viewfinder 13, and so forth. The rear cover 31 is attached to the rear side of the basic portion 23. The rear side of the cassette chamber 33, the photo film chamber 34 and a photo film passage provided between them are covered in light-tight fashion. There are bottom lids 35a and 35b in the rear cover 31 to hold the bottom of the cassette chamber 33, the photo film chamber 34 in light-tight fashion. The bottom lid 35a is opened in taking the photo film cassette 26 outside.

The flash device 25 has a printed circuit board 36 for forming a flash circuit 25a. The printed circuit board 36 is disposed in a side of the exposure unit 24. The flash projector 14, a main capacitor 37, a battery 38, a synchronizing switch 40 and a push switch 41 are attached to the exposure unit 36. An 1.5 V R6 battery is used as the battery 38. The synchronizing switch 40 is turned on when a shutter blade 62 (See FIG. 3) is fully opened. The push switch 41 is used for supplying electric power to the flash circuit 25a.

The flash changeover plate 15 is comprised of a changeover knob 15a that is capable of being operated externally, and a plate portion 15b that is integrated with the changeover knob 15a. The flash changeover plate 15 is slidable up and down between a lower OFF position and an upper ON position. The push switch 41 is turned on when the changeover plate 15 is at the ON position, so that the flash circuit 25a is active. On the other hand, the push switch 41 is turned off when the changeover plate 15 at the OFF position. The changeover plate 15 is click-stopped at the ON or the OFF position by a supporting plate 19.

Figure 3:
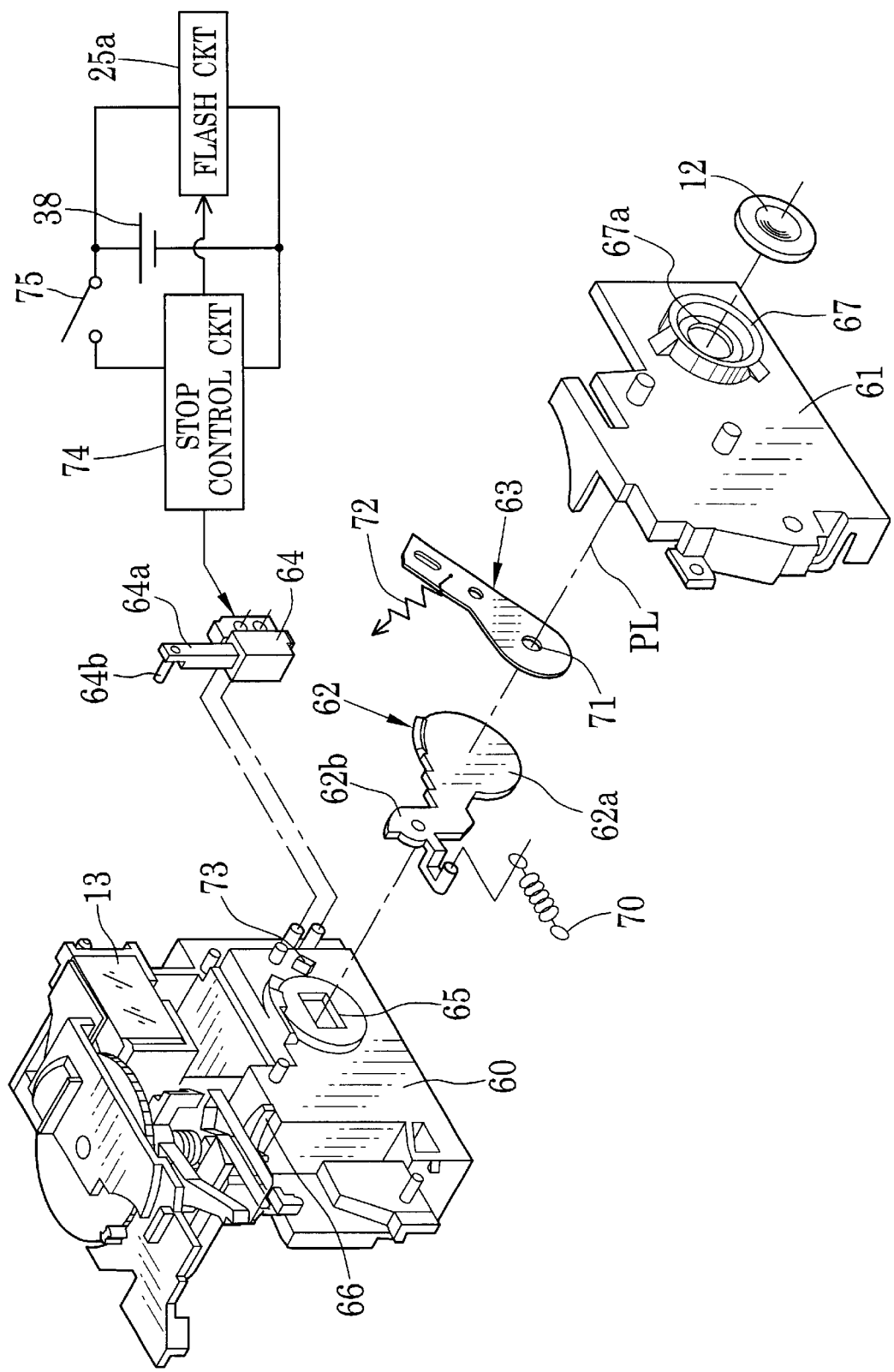
FIG. 3 is an exploded perspective view of an exposure unit.

As shown in FIG. 3, the exposure unit 24 is comprised of a base frame 60, a shutter cover 61, a shutter blade 62, a stop plate 63 and a solenoid 64. A shutter opening 65 is formed in center of the base frame 60. The viewfinder 13, a shutter driving lever 66 and so forth are attached to the top wall of the base frame 60. A lens holder 67 having a fixed stop opening 67a is provided on the shutter cover 61, and the taking lens 12 is put inside the lens holder 67.

When the photo film 27 is wound by one frame, a shutter driving unit (not shown) moves the shutter driving lever 66 against bias of a spring from a released position to a charged position, wherein the shutter driving lever 66 is locked by a lock lever (not shown). When the shutter button 17 is pressed down, the lock lever releases the shutter driving lever 66. Then, the shutter driving lever 66 returns back to the released position by bias of the spring.

The shutter blade 62 is comprised of a blade portion 62a and a mounting portion 62b, and is rotatably attached to the base frame 60. The shutter blade 62 is held by a bias of a spring 70 at a closed position in which the blade portion 62a lies on an optical axis PL to block subject light. The shutter driving lever 66 strikes an end of the mounting portion 62b while moving to the released position from the charged position. Then, the shutter blade 62 rotates against bias of the spring 70 so as to open the shutter opening 65. After the shutter opening 65 is fully opened, the shutter blade 62 returns back to the closed position by the bias of the spring 70. While the shutter opening 65 is opened, the photo film 27 is exposed to subject light.

Figure 4A:
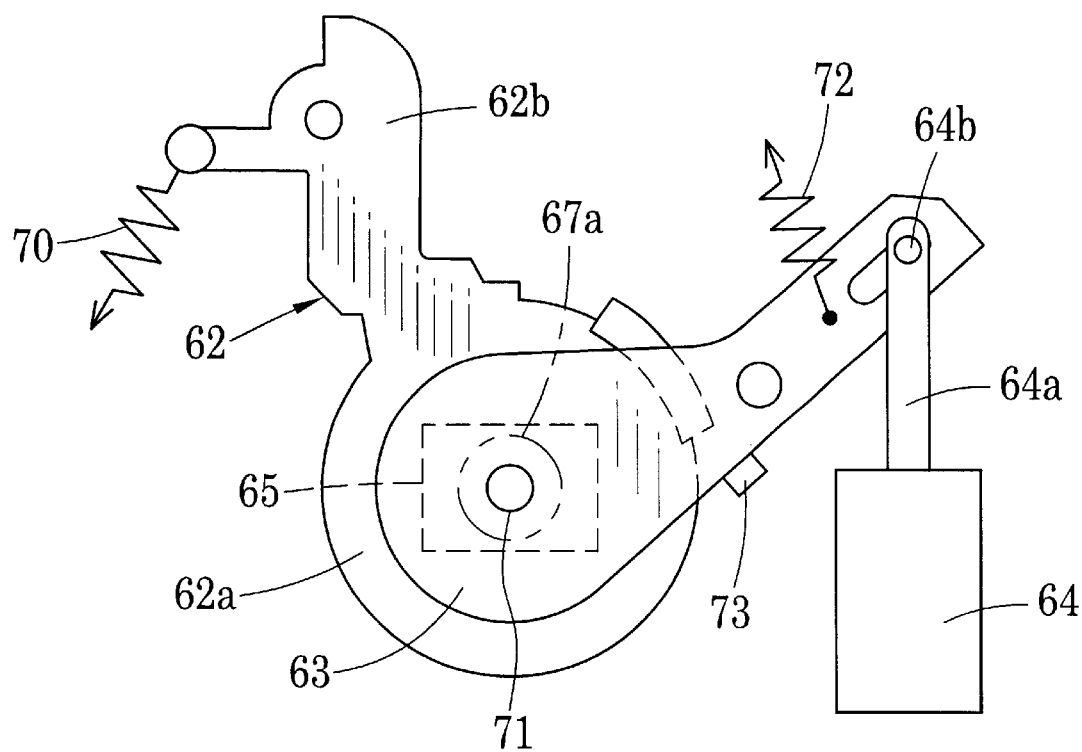
FIG. 4A is an explanatory view of a stop plate at a time when a subject brightness is equal to or more than a threshold level.

The stop plate 63 is rotatably attached to the base frame 60 between the shutter blade 62 and the fixed stop opening 67a. The stop plate 63 has a stop-down opening 71. The fixed stop opening 67a is larger than that of the stop-down opening 71, so the fixed stop opening 67a is used as the large stop opening. As shown in FIG. 4A, The stop plate 63 is held by bias of a spring 72 at a first position, in which the stop-down opening 71 is set on the optical axis PL. When the stop plate 63 is at the first position, the photo film 27 is exposed to subject light through the stop-down opening 71. The reference numeral 73 is a stopper for keeping the stop plate 63 at the first position.

Figure 4B:
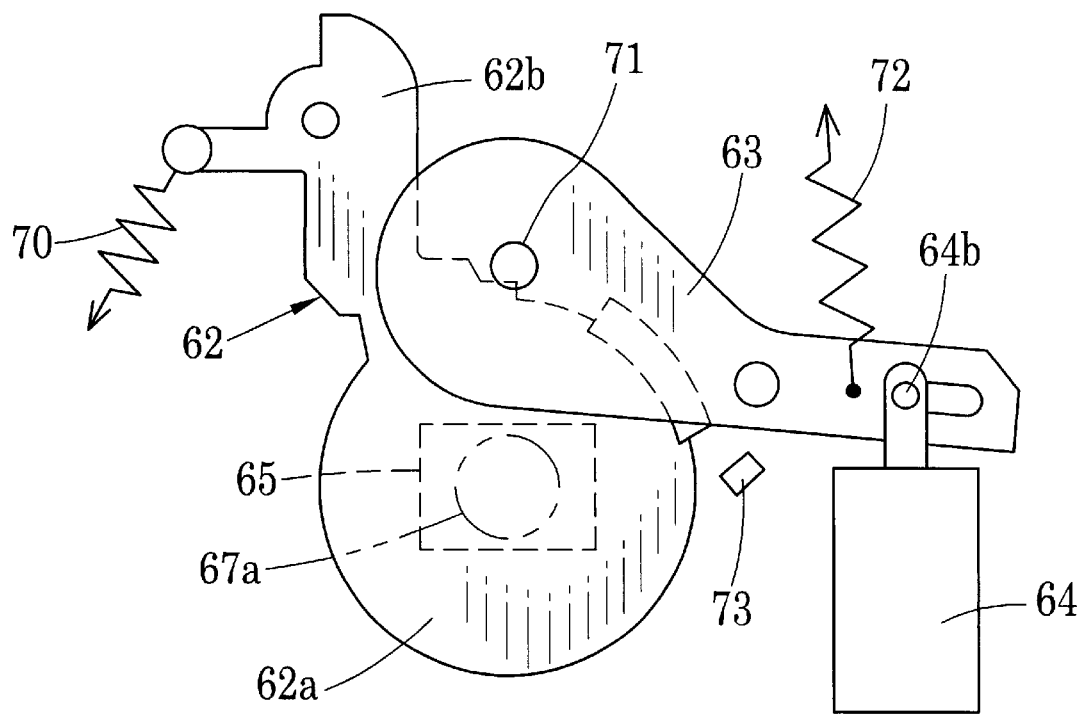
FIG. 4B is an explanatory view of a stop plate at a time when a subject brightness is less than a threshold level.

The solenoid 64 is fixed on the base frame 60, and is powered by a current conducted from a stop control circuit 74. A plunger 64a of the solenoid 64 is connected to the stop plate 63 through a pin 64b. When the solenoid 64 is powered, the plunger 64b is pulled inside the solenoid 64 against bias of the spring 72. Then, as shown in FIG. 4B, the stop plate 63 moves to a second position in which the stop plate 63 is retracted from the optical axis PL. Therefore, the photo film 27 is exposed to subject light through the fixed stop opening 67a.

The stop control circuit 74 is comprised of a photometry section for measuring a subject brightness, a deciding section for deciding whether the output current of the photometry section is equal to or more than a threshold level, and a driving section for driving the solenoid 64 according to a result of a decision in the deciding section. The stop control circuit 74, the solenoid 64, the stop plate 63 and so forth comprise the automatic exposure control device.

The stop control circuit 74 and the flash circuit 25a are formed on the printed circuit board 36. A photometry switch 75 is connected between the stop control circuit 74 and the battery 38. When the photometry switch 75 is turned on, the battery 38 supplies electric power to drive the stop control circuit 74. While the flash circuit 25a is driven, a decrease in the terminal voltage of the battery 38 is so large. Therefore, the flash circuit 25a is forced to stop while the stop control circuit 74 is driven. The battery 38 is used not only as a power source of the flash device 25, but as a power source of the stop control circuit 74.

The shutter driving unit has a shutter delay mechanism (not shown). When the shutter delay mechanism begins to work by depressing the shutter button 17, the photometry switch 75 is turned on. After a predetermined time passes, the photometry switch 75 is turned off. The shutter delay mechanism release the shutter driving lever 66 after the necessary time for moving the stop plate 63, that is 20 ms. Thereby, it is possible to prevent the photo film 27 from being exposed while the stop plate 63 is moving. The photometry switch 75 may be turned on while the shutter button 17 is depressed.

Figure 5:
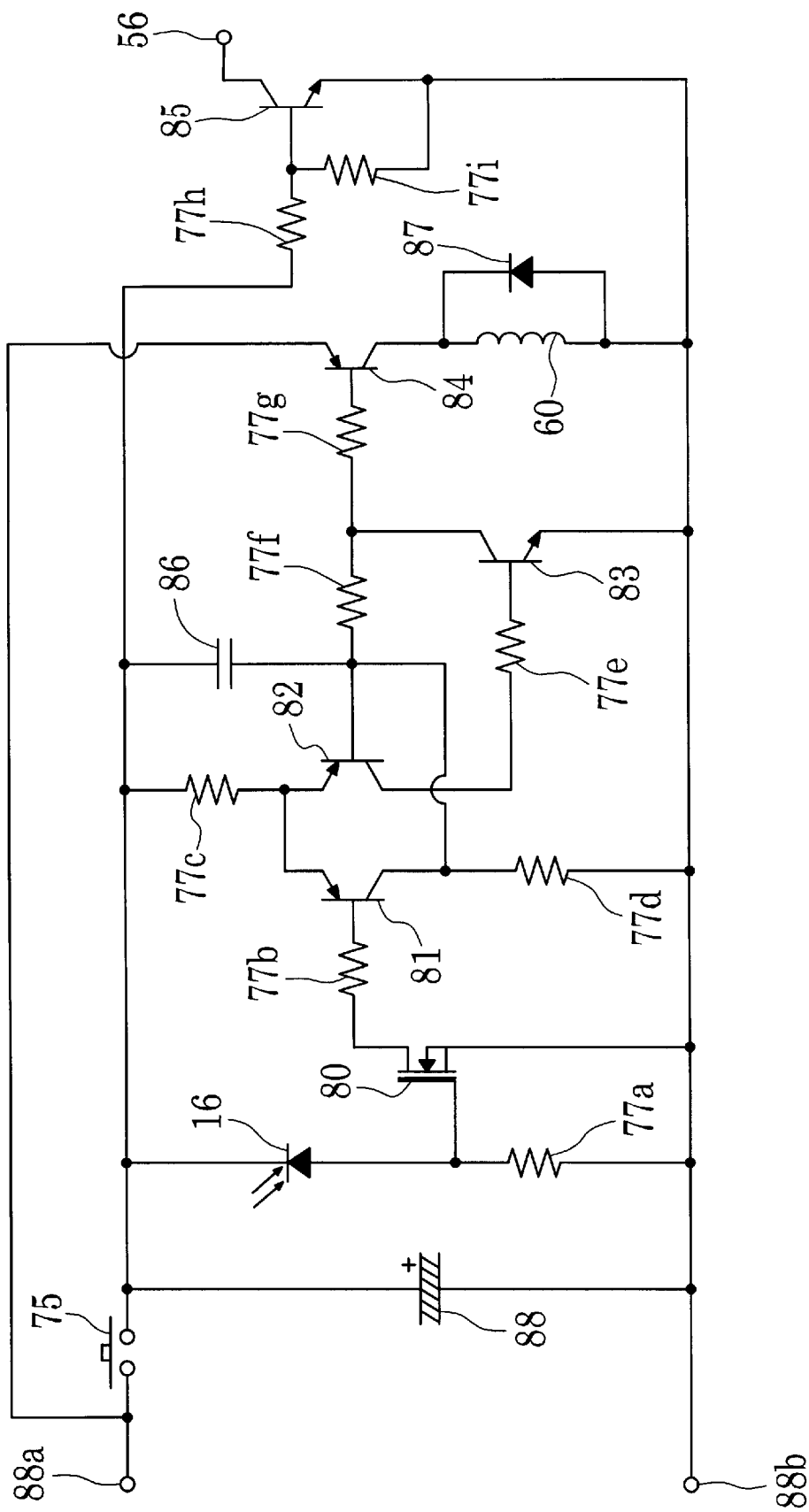
FIG. 5 is a circuit diagram of a stop control circuit.

As shown in FIG. 5, the stop control circuit 74 has the photo diode 16, a resistor 77a, an FET 80, a first trigger transistor 81, a second trigger transistor 82, a latch transistor 83, and transistors 84 and 85, and so forth. Power supplying terminals 88a and 88b are connected to the battery 38 (See FIG. 6), so the stop control circuit 74 is driven by electric power supplied from the battery 38.

The photo diode 16 and the resistor 77a are connected in series, and they comprise a photometry section. The cathode of the photo diode 16 is connected to the positive electrode of the battery 38 through the photometry switch 75, and the anode of the photo diode 16 is connected to the negative electrode of the battery 38 through the resistor 77a with high resistance. The photo diode 16 is inversely biased by the battery 38 when the photometry switch 75 is turned on. Then, the photo diode 16 generates a photo current according to an amount of incident light. A silicon photo diode may be used as the photo diode 16.

The anode of the photo diode 16 is connected to the gate of the N-channel type MOS FET 80. The source of the FET 80 is connected to the negative electrode of the battery 38, the drain of the FET 80 is connected to the base of the first trigger transistor 81 through a resistor 77b. Since the photo current generated in the photo diode 16 flows through a resistor 77a, a potential difference according to subject brightness is produced between both terminals of the resistor 77a. The potential difference is applied between the gate and source of the FET 80. The FET 80 is constructed to be turned off when the subject brightness is under a threshold level (hereinafter referred to as LV), and to be turned on when subject brightness is equal to or more than LV.

The emitters of the PNP first trigger transistor 81 and the PNP second trigger transistor 82 are connected to each other, and are also connected to the photometry switch 75 through a resistor 77c. The collector of the first trigger transistor 81 is connected to the negative electrode of the battery 38 through a resistor 77d. The collector of the second trigger transistor 82 is connected to the base of the latch transistor 83 through a resistor 77e. The circuit containing the first and the second trigger transistors 81 and 82 comprise the Schmidt trigger circuit. The Schmidt trigger circuit and the FET 80 comprise the deciding section.

When the FET 80 is turned on, the base potential of the first trigger transistor 81 decreases due to the current flowing through the resistor 77b, so that the first trigger transistor 81 is turned on. Then, the emitter potential and the base potential of the second trigger transistor 82 (equal to the collector potential of the first trigger transistor 81) are turned to be the same, so the second trigger transistor 82 is turned off.

On the other hand, when the FET 80 is turned off, a current flows into the base of the second trigger transistor 82 through a resistor 77d. Since the base potential of the second trigger transistor 82 decreases, the second trigger transistor 82 is turned on. Then, the first trigger transistor 81 is turned off. Thereby, only one among the two trigger transistors 81 and 82 is turned on according to a state of the FET 80.

Since the photo current is not generated in the photo diode 16 just after the photometry switch 75 is turned on, the FET 80 is turned off. So, there is a possibility that the second trigger transistor 82 is turned on before the FET 80 is turned on even in the case where a subject brightness is more than LV. Therefore, a delay capacitor 86 is connected to the base of the second trigger transistor 82 for delaying operation of the second trigger transistor 82.

The NPN latch transistor 83 is provided for keeping the second trigger transistor 82 turned on. The collector of the latch transistor 83 is connected to the base of the second trigger transistor 82 through a resistor 77f, and also connected to the base of the transistor 84 through a resistor 77g. The collector of the latch transistor 83 is connected to the negative electrode of the battery 38.

When the second trigger transistor 82 is turned on, its collector current flows into the base of the latch transistor 83 through the resistor 77e. Then, the latch transistor 83 is turned on. Since a current flows to the collector of the latch transistor 83, the base current of the second trigger transistor 82 increases more and more. Once the second trigger transistor 82 is turned on, the state of the second trigger transistor 82 is retained. Thereby, it is possible to prevent changing over the stops while exposing, and to expose the photo film 27 stably.

The collector of the PNP transistor 84 is connected to the solenoid 60 and a cathode of a protective diode 87. The emitter of the transistor 84 is connected to the positive electrode of the battery 38. When the latch transistor 83 is turned on, a current flows into the base of the transistor 84 through the resistor 77g. The transistor 84 is turned on, and the solenoid 64 is powered. Then, as shown in FIG. 4B, the plunger 64b is pulled into the solenoid 64 such that the stop plate 63 moves to the second position. The transistor 84 comprises the driving section. The protective diode 87 prevents the transistor 84 from being deteriorated or broken by inversed electromotive force produced at the moment when the solenoid 60 is turned on.

The base of the NPN transistor 85 is connected to the photometry switch 75 through a resistor 77h, and the corrector of the transistor 85 is connected to a terminal 56. A resistor 77i is connected to the emitter and the base of the transistor 85. When the photometry switch 75 is turned on, a certain amount of potential difference is applied between the base and the emitter of the transistor 85, causes to turn on the transistor 85. When the transistor 85 is turned on, the charging operation of the flash circuit 25a is forced to stop.

Because the flash circuit 25a stops while the stop control circuit 74 is in operation, it is possible to avoid a failure operation of the stop control circuit 74 due to the decrease in the terminal voltage of the battery 38.

Because the photometry switch 75 is turned on in a few micro seconds, it is difficult to do the stop changeover operation while the photometry switch 75 is turned on. Therefore, a capacitor 88 is connected to the battery 38. The photometry switch 75, and the capacitor 88 and the battery 38 comprise a charging circuit. The capacitor 88 is charged while the photometry switch 75 is turned on. After the photometry switch 75 is turned off, the stop control circuit 74 is driven in a predetermined time (1500 ms to 1600 ms) by the electrical charge that is charged in the capacitor 88. The electrostatic capacity of the capacitor 88 is determined in consideration of the time constant of the charging circuit and the necessary amount of the electrical charge for stop changeover. For instance, the value of the electrostatic capacity of the capacitor 88 may be set as 47 $\mu$F. When the contact resistance of the photometry switch 75 is 1$\Omega$, the time constant of the charging circuit is 47 $\mu$sec. In this case, it is possible to charge the capacitor 88 while the photometry switch 75 is turned on.

The solenoid 60 is powered from the battery 38 through the transistor 84, not from the capacitor 88. This is because the current that flows through the solenoid 60 is so large that the electrical charge in the capacitor 88 disappears at once.

Figure 6:
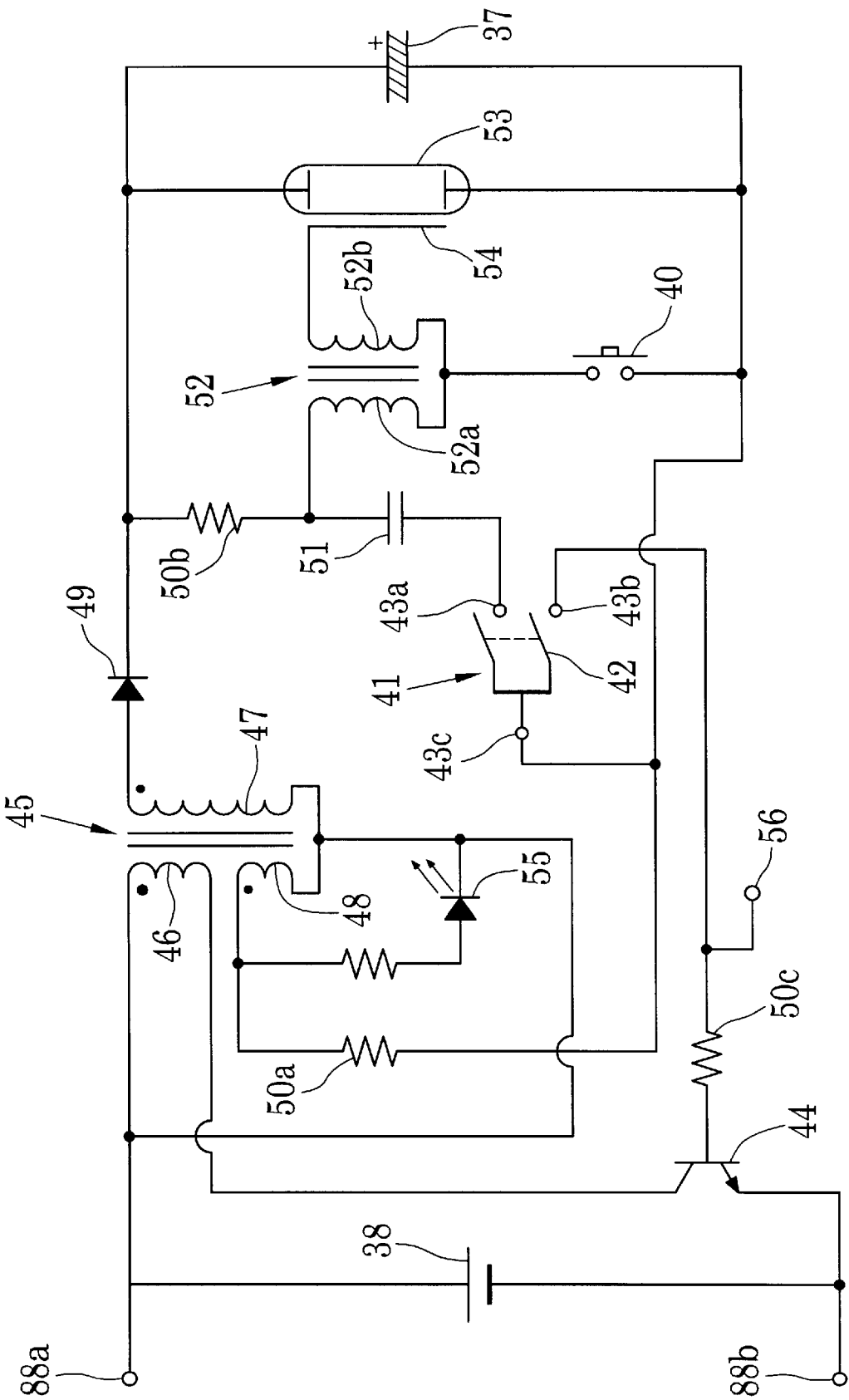
FIG. 6 is a circuit diagram of a flash circuit.

In FIG. 6, the flash circuit 25a is comprised of the main capacitor 37, the push switch 41, an oscillating transistor 44, an oscillating transformer 45, a rectifying diode 49, a trigger capacitor 51, a trigger transformer 52, a flash discharge tube and so on.

The push switch 41 is comprised of a movable segment 42, a first contact 43a, a second contact 43b and a third contact 43c. One end of the movable segment 42 is fixed to the third contact 43c. When the flash changeover plate 15 moves to the ON position, another end of the movable segment 43 contacts with the first and the second contacts 43a and 43b. Thereby, all contacts 43a to 43c are connected with one another.

The NPN oscillating transistor 44 and the oscillating transformer 45 constitute a well-known blocking circuit, and the blocking circuit transforms a low-level voltage of the battery 38 into a high-level voltage about 300 V for charging the main capacitor 37. The oscillating transformer 45 is comprised of a primary coil 46, a secondary coil 47 and a tertiary coil 48 which are inductively coupled to one another. One terminal of the primary coil 46 is connected to the positive electrode of the battery 38, another terminal of the primary coil 46 is connected to the collector of the oscillating transistor 44. One terminal of the secondary coil 47 is connected to the anode of the rectifying diode 49, another terminal of the secondary coil 47 and one terminal of the tertiary coil 48 are connected to the positive electrode of the battery 38. Another terminal of the tertiary coil 48 is connected to the third contact 43c of the push switch 41 through a resistor 50a.

The cathode of the rectifying diode 49 is connected to the plus pole of the main capacitor 37, and also connected to one pole of the trigger capacitor 51. Another pole of the trigger capacitor 51 is connected to the first contact 43a of the push switch 41. The emitter of the oscillating transistor 44 is connected to the negative electrode of the battery 38, and the base of the oscillating transistor 44 is connected to the second contact 43b through a resistor 50c.

The trigger transformer 52 is comprised of a primary coil 52a and a secondary coil 52b which are inductively coupled to each other and have a common terminal. One terminal of the secondary coil 52b is connected to a trigger electrode 54 that is located outside the flash discharging tube 53. The flash discharging tube 53 is disposed inside the flash projector 14. The common terminal of the trigger transformer 52 is connected to the push switch 41 through the synchronizing switch 40. The flash discharging tube 53 is connected to the main capacitor 37 in parallel.

In this configuration of the flash circuit 25a, the circuit from the positive electrode of the battery 38, through the tertiary coil 48, the resistor 50a, the push switch 41, the resistor 50c, and the base-emitter circuit of the oscillating transistor 44 to the negative electrode of the battery 38 comprises a biasing circuit for conducting a biasing current to turn on the oscillating transistor 44.

The circuit from the secondary coil 47, through the rectifying diode 49, the push switch 41, the resistor 50c, the base-emitter circuit of the oscillating transistor 44, and the battery 38 to the secondary coil 47 comprises a main charging circuit for conducting a secondary current to oscillate the oscillating transistor 44 and charge the main capacitor 37.

The circuit from the secondary coil 47, through the rectifying diode 49, the resistor 50b, the trigger capacitor 51, the push switch 41, the resistor 50c, the base-emitter circuit of the oscillating transistor 44, and the battery 38 to the secondary coil 47 comprises a subsidiary charging circuit for conducting the secondary current to charge the trigger capacitor 51.

In addition, the circuit from the trigger capacitor 51, through the primary trigger coil 52a, the synchronizing switch 40, and the push switch 41 to the trigger capacitor 51 comprises a trigger discharging circuit for conducting a current from the trigger capacitor 51 into the primary trigger coil 52a at the moment when the synchronizing switch 40 is turned on.

When the push switch 41 is turned on, the oscillating transistor 44 is turned on for conducting the collector current through the primary coil 46. Then, an electromotive force is generated in the secondary coil 47 according to the turn ratio of the secondary coil 47 to the primary coil 46. The electromotive force causes the secondary current to flow as the base current of the oscillating transistor 44. That is, because of positive feedback from the oscillating transformer 45, the collector current of the oscillating transistor 44 increases. At that time, the secondary current generated in the secondary coil 47 conducts through the main charging circuit and the subsidiary charging circuit, causes to charge the main capacitor 37 and the trigger capacitor 51 respectively.

The reference numeral 55 shows a light emitting diode (LED) provided below the indication light guide 21. The anode of the LED 55 is connected to one terminal of the tertiary coil 48, and the cathode of the LED 55 is connected to another terminal of the tertiary coil 48. When the main capacitor 37 is charged up to a predetermined voltage, a terminal voltage of the tertiary coil 48 is over the set voltage such that LED 55 starts lighting.

When the synchronizing switch 40 is turned on after the main capacitor 37 is charged up to the predetermined voltage, the trigger discharging circuit is closed. Then, the trigger capacitor 51 is discharged so that a current flows through the primary coil 52a, inducing the high-level trigger voltage across the secondary coil 52b. The trigger voltage is applied through the trigger electrode 54 to the flash discharging tube 53. The main capacitor 37 is discharged through the flash discharging tube 53. Thereby, flash light is projected through the flash projector 14.

In the flash circuit 25a described above, the charge voltage of the main capacitor 37 is positive, and the casing of the main capacitor 37 is set to be ground. Therefore, it is possible to photograph without being shocked even in the case where the housing 10 is wet. The main capacitor 37, the primary coil 46, the rectifying diode 49, the flash discharging tube 53 and the LED may be connected inversely.

A terminal 56 of the stop control circuit 74 is connected to the resistor 50c. When the photometry switch 75 is turned on, the transistor 85 is also turned on. Then, the oscillating transistor 44 is turned off to stop charging operation of the flash circuit 25a. On the other hand, when the stop control circuit 74 is not operated, the flash circuit 25a is operated if the push switch 41 is turned on.

Figure 7:
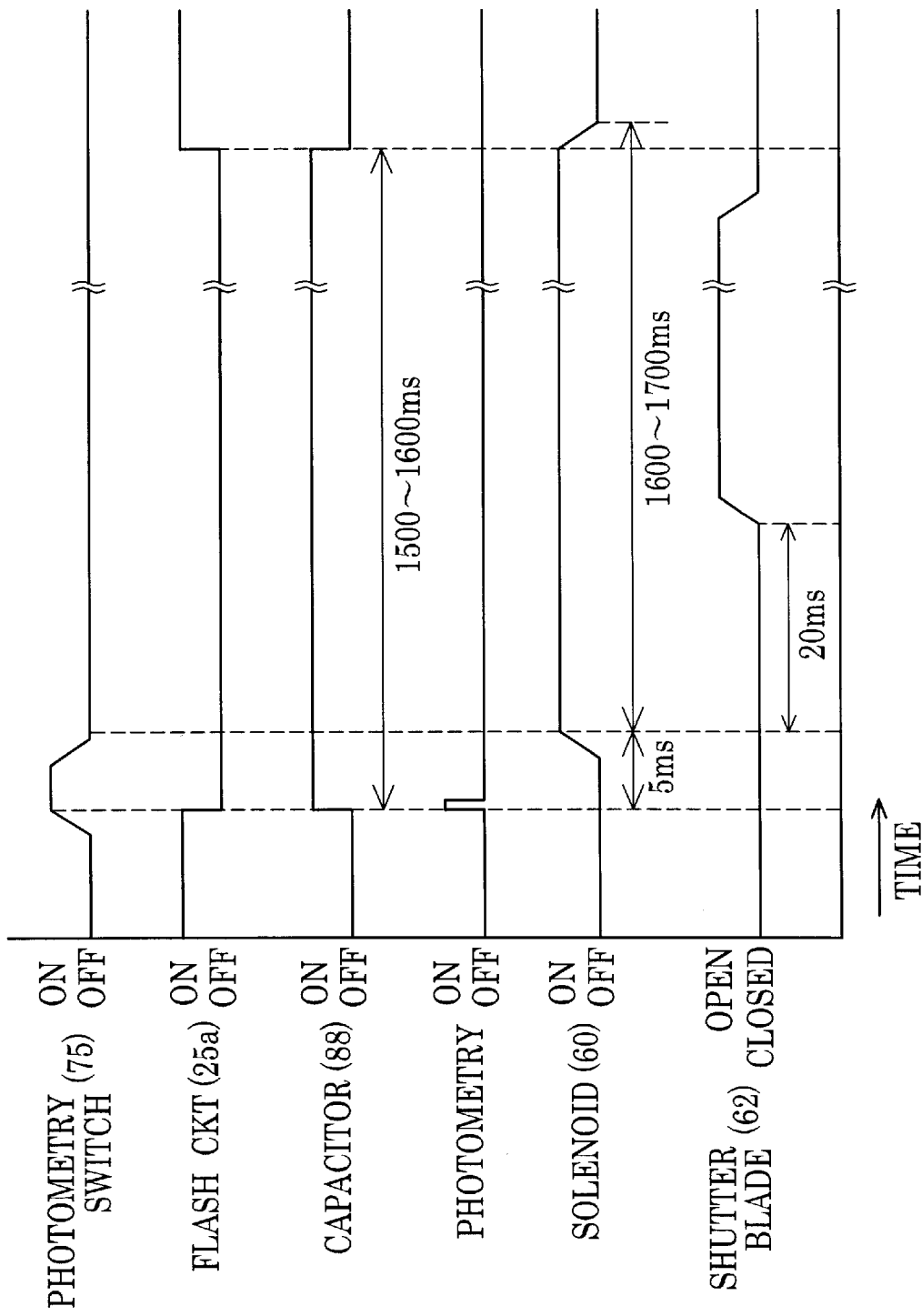
FIG. 7 is a time chart in controlling an exposure.

FIG. 7 shows a timing chart in controlling exposure in flash photography mode. When the shutter button 17 is depressed, the photometry switch 75 is turned on. Then, because the transistor 85 is turned on, the flash circuit 25a is forced to stop the charging operation. In addition, the capacitor 88 is charged, and the photo diode 16 is driven for generating a photo current according to a subject brightness.

When subject brightness is less than LV, the FET 80 and the first trigger transistor 81 are not turned on because since the gate-source voltage of the FET 80 is low. Then, base current of the second trigger transistor 82 flows through the resistor 77e, so that the second trigger transistor 82 is turned on. In this case, the delay capacitor 86 keeps the second trigger transistor 82 turned off until the output current of the photo diode 16 becomes stable.

When the second trigger transistor 82 is turned on, the latch transistor 83 and the transistor 84 are turned on. Thereby, the solenoid 60 is powered to move the stop plate 63 to the second position. After the shutter button 17 is depressed, the shutter delay mechanism keeps the shutter driving lever 66 at the charged position. After the necessary time for moving the stop plate 63, e.g. about 20 ms, the shutter driving lever 66 is released and rotates the shutter blade 62. Thereby, an exposure is taken through the large stop opening.

Although the photometry switch 75 is turned off before powering the solenoid 60, the capacitor 88 supplies the electric power to the photo diode 16, the FET 80, the shumitt trigger circuit and so forth. After the exposure is completed by returning back the shutter blade 62 to the closed position, the capacitor 88 is completely discharged. The operation of the stop control circuit 74 stops, and the solenoid 60 is not powered. Thereby, the stop plate 63 returns back to the first position by bias of the spring 72. Since the transistor 85 is turned off, the flash circuit 25a begins charging operation.

On the other hand, when subject brightness is equal to or more than LV, the FET 80 and the first trigger transistor 81 are turned on. In this case, since the second trigger transistor 82 is turned off, the latch transistor 83 and the transistor 84 are also turned off. Therefore, since the solenoid 60 is not powered, the stop plate 63 is kept at the first position to set the stop-down opening 71 on the optical axis PL.

Next, the operation of the above described configurations will be described. When the winding dial 22 is rotated, an unexposed photo film 27 is drawn from the photo film chamber 34 to be set behind the exposure opening 32. Accompanying with the movement of the photo film 27, the shutter driving lever 66 is moved to the charged position in which the lock lever keeps the shutter driving lever 66. When the photo film is wound by one frame, a film winding mechanism (not shown) locks the winding dial 22. In this state, since the photometry switch 75 is turned off, so the stop control circuit 74 is not operated. Therefore, it is possible to save power of the battery 38.

A subject is framed through the viewfinder 13. Thereinafter, when the shutter button 17 is depressed, the photometry switch 75 is turned on, and the stop control circuit 74 is operated. When subject brightness is less than LV, the solenoid 60 is turned on for moving the stop plate 63 into the second position, shown in FIG. 4B. On the other hand, when subject brightness is equal to or more than LV, the solenoid 60 is turned off, so the stop plate 63 is kept at the first position, shown in FIG. 4A.

When a predetermined time, about 20 ms, passes after the shutter button 17 is depressed, the shutter driving lever 66 is released, and moves to the released position from the charged position. In the movement of the shutter driving lever 66, the shutter blade 62 is struck, so an exposure is taken on the photo film 27.

In cases where an outdoor photography is performed in a fine condition, the subject is so bright that the exposure is taken through the stop-down opening 71. The exposure amount is decreased because of the stop-down opening 71, so it is possible to prevent an over-exposure. On the other hand, in an indoor photography, the subject is not so bright, the exposure is taken through the stop opening 67a. In this case, the exposure amount is not decreased, so it is possible to prevent an under-exposure.

In a night photography, the subject is so dark that exposure is taken with flash, by sliding the changeover knob 15a to the ON position from the OFF position. The flash circuit 25a is operated to charge the main capacitor 37. When the main capacitor 37 is fully charged, indicating light emitted in the LED 55 passes through the indication light guide 21. Then, the shutter button 17 is depressed to take a photograph. In this case, since subject brightness is less than LV, the solenoid 60 is powered. Therefore, the exposure is taken through the fixed stop opening 67a.

Figure 8:
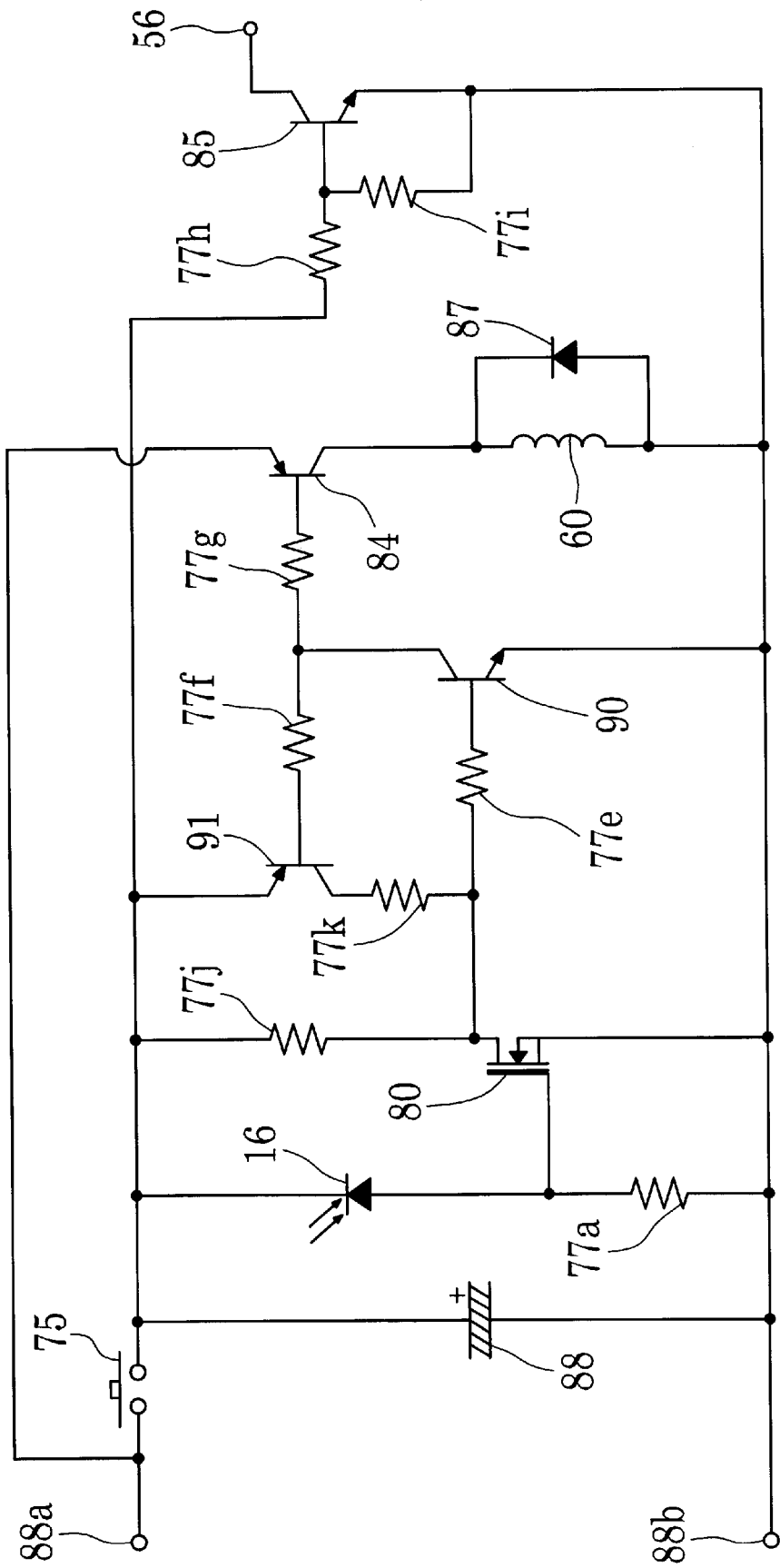
FIG. 8 is a circuit diagram of another stop control circuit.

FIG. 8 shows an another configuration of the stop control circuit of the present invention. Elements similar to those of the above embodiment are designated with identical reference numerals.

The stop control circuit in this embodiment has an NPN transistor 90 and a PNP latch transistor 91 between the FET 80 and the transistor 84. The drain of the FET 80 is connected to the photometry switch 75 through the resistor 77j. The base of the transistor 90 is connected to the collector of the latch transistor 91 through the resistors 77e and 77k. The base of the latch transistor 91 is connected to the base of the transistor 84 through the resistors 77f and 77g. The emitter of the latch transistor 91 is connected to the photometry switch 75.

When the photometry switch 75 is turned on, the photo diode 16 is driven for generating a photo current according to subject brightness. In cases where subject brightness is equal to or more than LV, the FET 80 is turned on, so the current is conducted to the FET 80 through the resistor 77j. Then, the transistor 90 and the latch transistor 91 are turned off because their base currents are not conducted. Since the transistor 84 is not turned on, the solenoid 60 is not powered. Therefore, the stop plate 63 is kept at the first position, an exposure is taken through the stop-down opening 71.

On the other hand, when a subject brightness is less than LV, the FET 80 is not turned on, so the base current of the transistor 90 flows through the resistors 77j and 77e. Then, the latch transistor 91 is turned on. Once the transistor 90 is turned on, the latch transistor 91 keeps the transistor 90 on until the capacitor 88 is discharged. The collector current of the transistor 90 flows to the base of the transistor 84, and the transistor 84 is turned on. Since the solenoid 60 moves the stop plate 63 to the second position, an exposure is taken through the fixed stop opening 67a.

In the above described embodiments, the solenoid 60 is powered when subject brightness is less than LV, but the solenoid 60 may be powered when subject brightness is equal to or more than LV. The stop plate may be formed a large stop opening and a small stop opening, and each of them may be inserted according to a subject brightness.

In the above described embodiments, the solenoid 60 is used as electromagnetic force generating means, but it may be applied to the present invention to use an electromagnet for pulling an iron piece attached to the stop plate 63. Although the present invention has been described with respect to the film unit, the present invention is also applicable to a compact camera and an electronic still camera.

Thus, the present invention is not to be limited to the above embodiments, but on the contrary, various modifications are possible to those skilled in the art without departing from the scope of claims appended hereto.

What is claimed is:

1. An automatic exposure control device for a camera for measuring subject brightness and controlling size of stop opening prior to a photography, said automatic exposure control device comprising:

a photo diode for measuring subject brightness;

a resistor which is connected to said photo diode in series;

a field effect transistor, having a gate and a source between which a terminal voltage across said resistor is applied, being turned on when said terminal voltage is equal to or more than a threshold level, being turned off when said terminal voltage is under said threshold level;

electromagnetic force generating means controlled for being powered according to a state of said field effect transistor;

a first transistor electrically connected so as to be in a state opposite to a state of said field effect transistor, wherein said electromagnetic force generating means is controlled to be powered according to said state of said first transistor; and a stop plate for moving to a large stop position or a small stop position according to a state of said electromagnetic force generating means, and for setting said size of said stop opening larger when at said large stop position than when at said small stop position.

2. An automatic exposure control device as claimed in claim 1, wherein said field effect transistor is a metal-oxide semiconductor transistor.

3. An automatic exposure control device as claimed in claim 2, further comprising a switch which is turned on by a shutter release operation, wherein said photo diode is driven for photometry when said switch is turned on.

4. An automatic exposure control device as claimed in claim 3, wherein said stop plate has a stop-down opening, said stop-down opening being set on an optical axis at said small stop position, said stop plate being retracted from said optical axis at said large stop position.

5. An automatic exposure control device as claimed in claim 3, wherein said electromagnetic force generating means is a solenoid.

6. An automatic exposure control device as claimed in claim 3, wherein a terminal voltage of a battery for supplying electric power is 1.5 V.

7. An automatic exposure control device as claimed in claim 6, further comprising a flash circuit, electric power for driving said flash circuit being supplied from said battery.

8. An automatic exposure control device as claimed in claim 7, further comprising a stopping circuit for forcing said flash circuit to stop a charging operation while said switch is turned on.

9. An automatic exposure control device for a camera for measuring subject brightness and controlling size of stop opening prior to a photography, said automatic exposure control device comprising:

a photo diode for measuring subject brightness;

a switch which is turned on by a shutter release operation, wherein said photo diode is driven for photometry when said switch is turned on;

a resistor which is connected to said photo diode in series;

a metal-oxide semiconductor field effect transistor, having a gate and a source between which a terminal voltage across said resistor is applied, being turned on when said terminal voltage is equal to or more than a threshold level, being turned off when said terminal voltage is under said threshold level;

a solenoid controlled for being powered according to a state of said field effect transistor;

a stop plate for moving to a large stop position or a small stop position according to a state of said electromagnetic force generating means, and for setting said size of said stop opening large when at said large stop position than when at said small stop position; and a first transistor which turns to be in a state opposite to said state of said field effect transistor, wherein said solenoid is controlled for being powered according to said state of said first transistor.

10. An automatic exposure control device as claimed in claim 9, further comprising a second transistor which turns to be in a state a same as said state of said first transistor, said solenoid being connected to said second transistor in series.

11. An automatic exposure control device as claimed in claim 10, further comprising a first capacitor for delaying operation of said first transistor, so as to turn on said first transistor when a predetermined time passes after said switch is turned on.

12. An automatic exposure control device as claimed in claim 11, further comprising a latch circuit for keeping said first transistor turned on.

13. An automatic exposure control device as claimed in claim 12, wherein a battery supplies electrical power for driving said photo diode, said field effect transistor, said first transistor and said latch circuit through said switch, and said battery supplies electrical power directly for driving said second transistor and said solenoid.

14. An automatic exposure control device as claimed in claim 13, further comprising a second capacitor that is charged while said switch is turned on, said second capacitor supplying electrical power for driving said photo diode, said field effect transistor, said first transistor and said latch circuit after said switch is turned off.

* * * * *